Sept. 10, 1929.    C. CHRISTIANSEN    1,728,150
PLATFORM ADJUSTING MEANS FOR COMBINED HARVESTERS AND SHOCKERS
Filed April 23, 1928    3 Sheets-Sheet 1

Inventor
Christian Christiansen

Witness
H. Woodard

By H. B. Willson & Co.
Attorneys

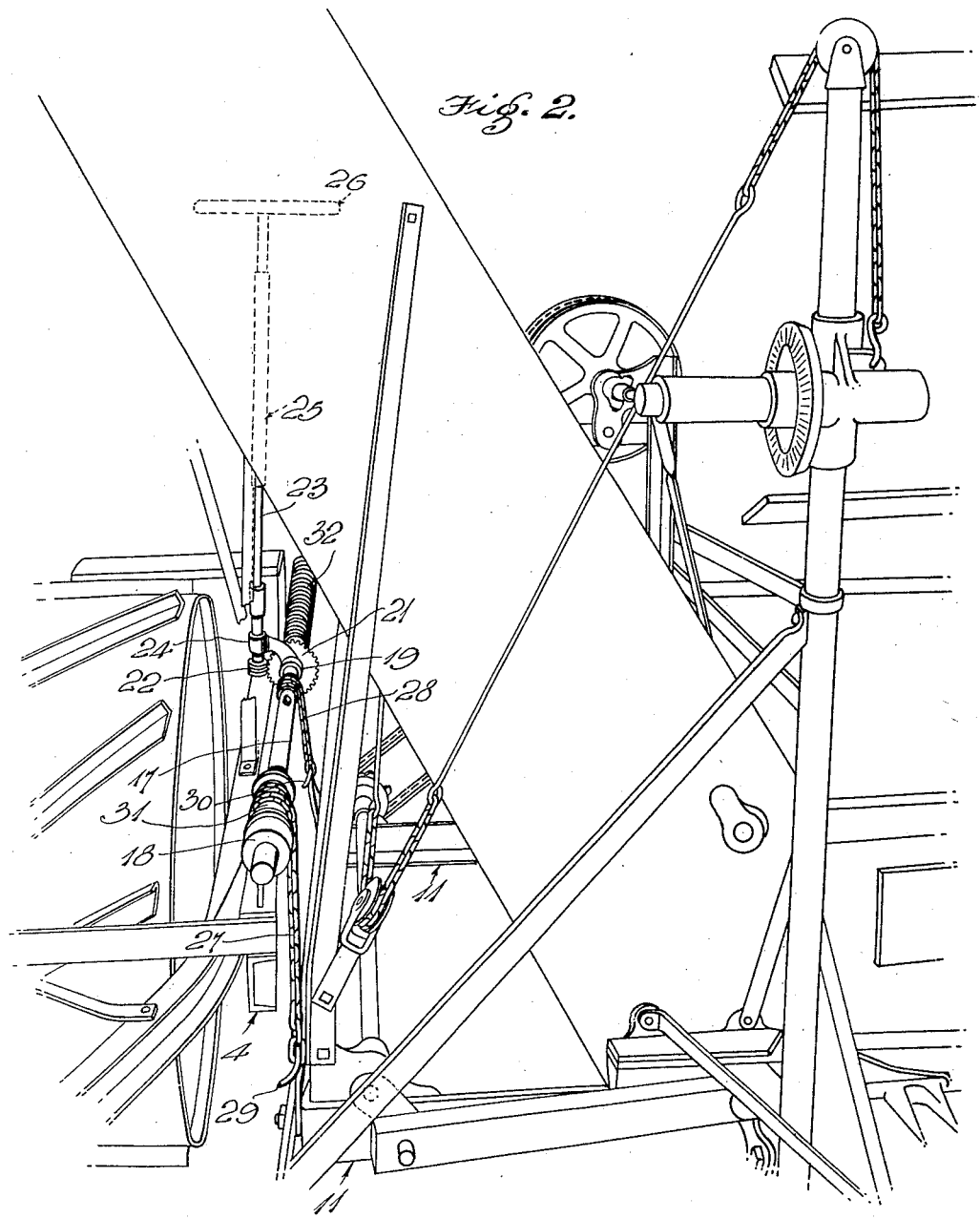

Sept. 10, 1929.　　　C. CHRISTIANSEN　　　1,728,150
PLATFORM ADJUSTING MEANS FOR COMBINED HARVESTERS AND SHOCKERS
Filed April 23, 1928　　　3 Sheets-Sheet 3
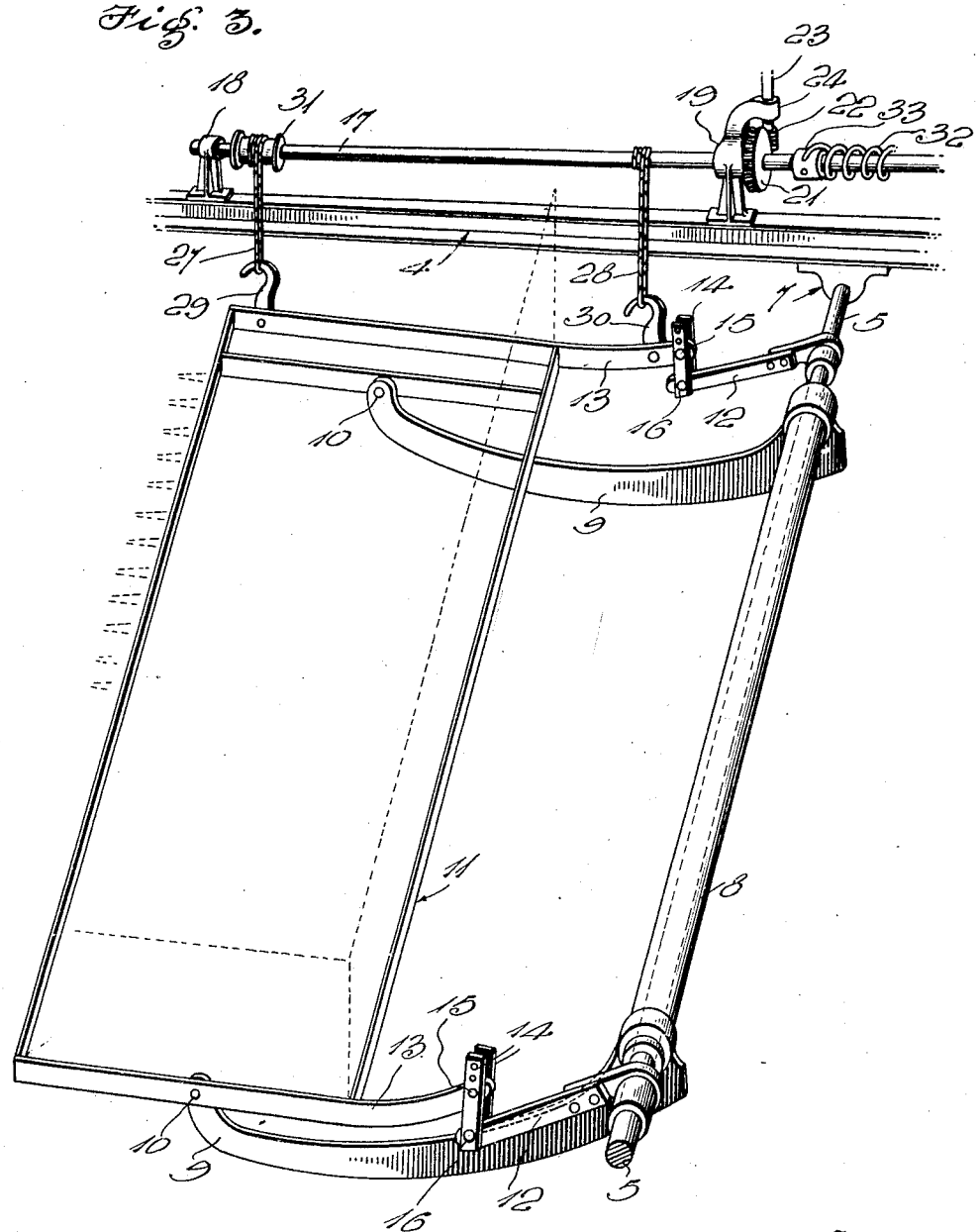

Patented Sept. 10, 1929.

1,728,150

UNITED STATES PATENT OFFICE.

CHRISTIAN CHRISTIANSEN, OF FARGO, NORTH DAKOTA.

PLATFORM-ADJUSTING MEANS FOR COMBINED HARVESTERS AND SHOCKERS.

Application filed April 23, 1928. Serial No. 272,262.

The invention relates to improvements in combined harvesting and shocking machines, of the general type shown in my U. S. Patent No. 1,656,774, of January 17, 1928.

It is the object of the invention to provide new and improved means for effecting any desired vertical adjustments of the platform frame of the harvester, the construction being such that said frame will be held rigidly in any position to which it may be adjusted.

With the foregoing in view, the invention resides in the novel subject matter hereinafter described and claimed, description being accomplished by reference to the accompanying drawings.

Fig. 2 is a perspective view looking directly from the front toward the rear.

Fig. 3 is a perspective view with parts omitted, looking directly inward from the outer end of the platform frame.

Figure 1:
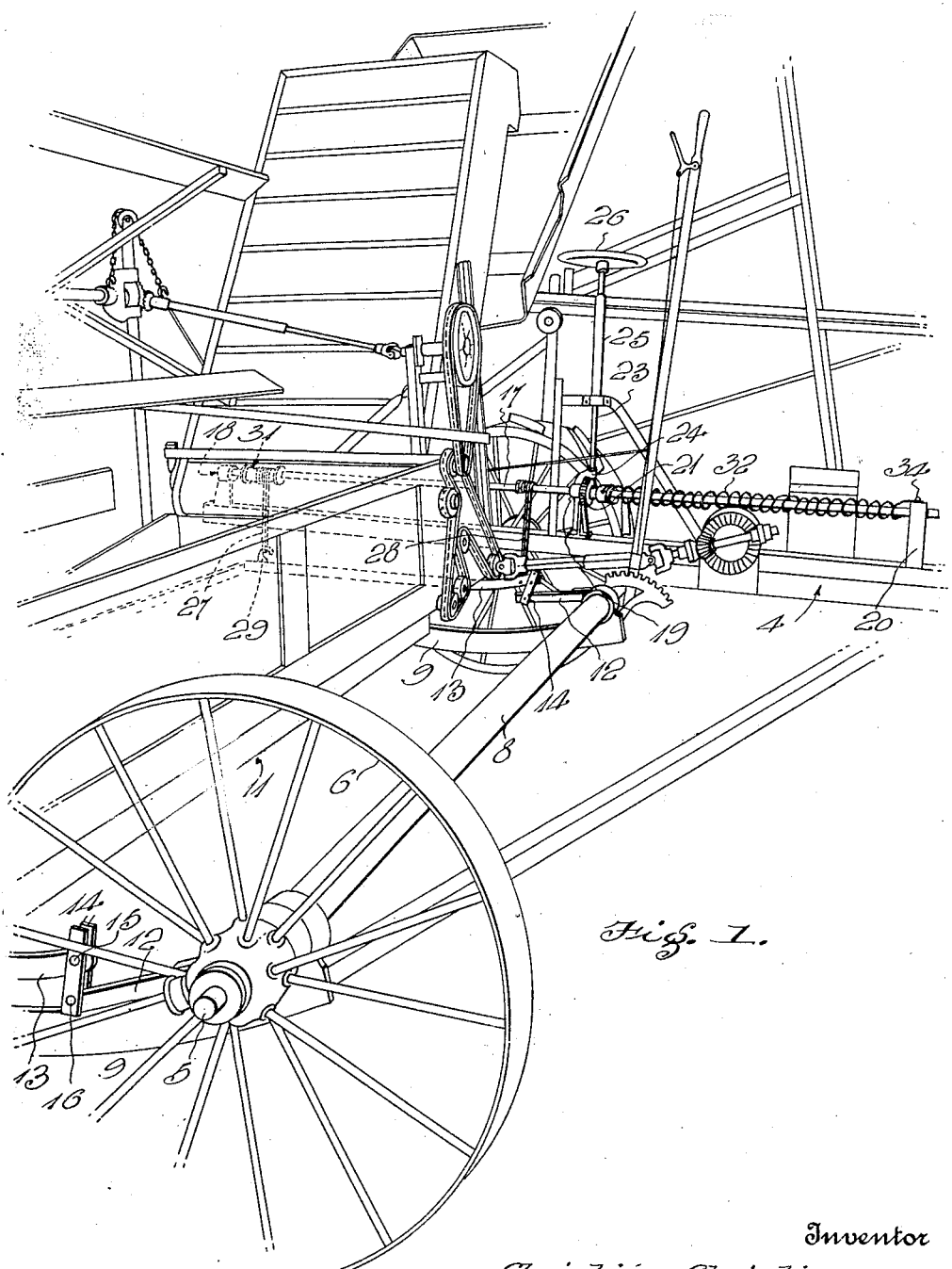
Fig. 1 is a perspective view of a combined machine of the type set forth, looking diagonally from the rear toward the front.

A number of parts shown in the drawings are elements of combined machine which do not constitute parts of the invention herein claimed, but the descriptive matter will be so confined as to support only the claimed invention.

The numeral 4 denotes the frame of a shocking machine and 5 has reference to an axle projecting laterally from one side of said frame 4, the outer end of said axle being supported by a wheel 6, while suitable bearing means 7 is provided for so connecting the inner end of the axle with the frame 4, as to permit rocking of said axle about its longitudinal axis.

Surrounding the axle 5 between the bearing means 7 and the wheel 6, is a sleeve 8 which is inherently rigid throughout its length but is free to turn upon said axle. Suitably secured to this sleeve and preferably disposed at the ends thereof are two arms 9 which project forwardly and are pivoted at 10 to a platform frame 11 which is disposed in the angle between the frame 4 and the sleeve 8, in front of the latter.

Secured to the axle 5, at the ends of the sleeve 8, are two additional arms 12 which project forwardly therefrom and are connected by suitable means with the frame 11 at points spaced behind the pivots 10. In the present showing, the frame 11 is provided with rearward extensions 13 overlying the front ends of the arms 12 and links 14 are pivoted at 15 and 16 respectively, to these extensions 13 and the arms 12.

A shaft 17 extends longitudinally of the portion of the frame 4 adjacent the platform frame 11 and is mounted in a plane above said platform frame in appropriate bearings 18—19—20. Secured upon the shaft 17 near the bearing 19, is a worm-wheel 21 meshing with a worm 22 on a vertical shaft 23, the latter being mounted in a bearing 24 at its lower end and in a bearing sleeve 25 at its upper portion. This shaft 23 is provided with a hand-wheel 26 and rotation of this hand-wheel serves to rotate the shaft 17. Front and rear chains 27—28 are secured to the shaft 17 at their upper ends and at their lower ends are connected with the front and rear portions of the frame 11, at the inner end of the latter, hooks 29—30 being preferably employed for this purpose. Preferably, the front portion of shaft 17 is provided with an enlarged cylindrical part 31 upon which the chain 27 is wound as the shaft is rotated in one direction, chain 28 being then wound directly on a smaller portion of the shaft. Thus, it is insured that the front end of the platform frame 11 shall raise or lower more rapidly than the rear end thereof, for the usual well known purpose. Due to the provision of the arms 9—12, axle 5, sleeve 8, etc., any vertical movement or tilting movement imparted to the inner end portion of the frame 11, is similarly and uniformly imparted to the outer end portion thereof, and the frame is rigidly held in any position to which it may be adjusted.

Preferably, an elongated coil spring 32 surrounds the rear portion of the shaft 17 and is secured to the latter at one of its ends, as denoted at 33. The other end of the spring 32 is secured at 34 to the bearing 20. When shaft 17 is rotated in a direction to lower the frame 11, spring 32 is wound or placed under tension by such rotation, said spring being thereby conditioned to assist in turning the shaft 17 in frame-raising direction. The spring 32 substantially counterbalances the weight of the frame 11 and parts carried by the latter, and hence the hand-wheel 26 may be rotated with ease to either raise or lower said frame and parts.

Excellent results have been obtained from the general construction shown and described and it is therefore preferably followed. However, within the scope of the invention as claimed, variations may of course be made.

I claim:

1. In a portable machine, a main frame, an axle projecting laterally therefrom and having a supporting wheel at its outer end, bearing means connecting the inner end of said axle with said frame and permitting rocking of said axle, a sleeve surrounding said axle and free to turn thereon, arms secured to and projecting forwardly from said sleeve, a platform frame pivoted to said arms on axes parallel with said axle, additional arms secured to and projecting forwardly from said axle, means connecting the front ends of said additional arms with said platform frame at points spaced longitudinally of the machine from said axes, and means mounted on said main frame and connected with the inner end of said platform frame for effecting raising and lowering of the latter.

2. In a portable machine, a main frame, an axle projecting laterally therefrom and having a supporting wheel at its outer end, bearing means connecting the inner end of said axle with said frame and permitting rocking of said axle, a sleeve surrounding said axle and free to turn thereon, arms secured to and projecting forwardly from said sleeve, a platform frame pivoted to said arms on axes parallel with said axle, additional arms secured to and projecting forwardly from said axle, means connecting the front ends of said additional arms with said platform frame at points spaced longitudinally of the machine from said axes, and means mounted on said main frame and connected with the inner end of said platform frame for effecting raising and lowering of the latter, said raising and lowering means embodying means for moving the front portion of said platform frame more rapidly than the rear portion thereof.

3. In a portable machine, a main frame, an axle projecting laterally from one side of the frame and having a supporting wheel at its outer end, means connecting the inner end of said axle with said frame, a sleeve surrounding said axle and free to turn thereon, arms secured to and projecting forwardly from said sleeve, a platform frame pivoted to said arms on axes parallel with said axle, and means mounted on said main frame and connected with the inner end of said platform frame for effecting raising and lowering of the latter.

4. In a portable machine, a main frame, an axle projecting laterally from one side of the frame and having a supporting wheel at its outer end, means connecting the inner end of said axle with said frame, a sleeve surrounding said axle and free to turn thereon, arms secured to and projecting forwardly from said sleeve, a platform frame pivoted to said arms on axes parallel with said axle, and means mounted on said main frame and connected with the inner end of said platform frame for effecting raising and lowering of the latter, said raising and lowering means embodying means for moving the front portion of said platform frame more rapidly than the rear portion thereof.

5. In a portable machine, a main frame, a platform frame at one side of said main frame, pivoted means connecting the two frames and permitting vertical movement and tilting of said platform frame, a shaft extending longitudinally of said side of the main frame and spaced above the platform frame, the front end of said shaft having a cylindrical enlargement, means for rotating said shaft, and front and rear chains connected to the front and rear portions of said platform frame at the inner end thereof, said chains being secured to said shaft to be wound thereon, the front chain being disposed for winding on said shaft enlargement.

6. A structure as specified in claim 5; together with an elongated coiled spring surrounding a portion of said shaft, one end of said spring being secured to the shaft and the other end of said spring being anchored to said main frame, said spring being tensioned by rotation of the shaft in platform-lowering direction whereby it will assist in turning said shaft in platform-raising direction.

7. In a portable machine, a main frame, an axle projecting laterally therefrom and having a supporting wheel at its outer end, bearing means connecting the inner end of said axle with said frame and permitting rocking of the axle, arms secured to and projecting forwardly from the end portions of said axle, a platform frame pivoted to the front ends of said arms, and means mounted on said main frame and connected with the inner end of said platform frame for effecting raising and lowering of the latter.

In testimony whereof I have hereunto affixed my signature.

CHRISTIAN CHRISTIANSEN.